United States Patent [19]

Agano et al.

[11] Patent Number: 5,265,865
[45] Date of Patent: Nov. 30, 1993

[54] STIMULABLE PHOSPHOR SHEET FEEDING AND STORING MECHANISM AND STIMULABLE PHOSPHOR SHEET CASSETTE

[75] Inventors: Toshitaka Agano; Koichi Okada, both of Kanagawa, Japan

[73] Assignee: Fuji Photo Film Co., Ltd., Kanagawa, Japan

[21] Appl. No.: 989,469

[22] Filed: Dec. 8, 1992

Related U.S. Application Data

[63] Continuation of Ser. No. 684,119, Apr. 12, 1991, abandoned.

[30] Foreign Application Priority Data

Apr. 13, 1990 [JP] Japan ................... 2-97874
Apr. 20, 1990 [JP] Japan ................... 2-105866

[51] Int. Cl.$^5$ ................... B65H 1/00; B65H 31/00; B65H 5/02
[52] U.S. Cl. ................... 271/1; 271/145; 271/163; 271/207; 271/267; 271/273; 206/455; 378/182; 378/188; 250/588
[58] Field of Search ................... 271/1, 145, 207, 264, 271/267, 272, 273, 163; 206/455; 250/327.25, 484.1 B; 378/182, 184–188

[56] References Cited

U.S. PATENT DOCUMENTS

| | | |
|---|---|---|
| 3,296,437 | 1/1967 | Meschan .................. 378/185 X |
| 3,784,835 | 1/1974 | Schmidt ................... 378/187 |
| 3,845,314 | 10/1974 | Byler et al. ............... 378/185 X |
| 3,857,040 | 12/1974 | Zwettler et al. ........... 378/186 |
| 4,008,483 | 2/1977 | Swift et al. ............... 206/455 X |
| 4,258,264 | 3/1981 | Kotera et al. . |
| 4,276,473 | 6/1981 | Kato et al. . |
| 4,315,318 | 2/1982 | Kato et al. . |
| 4,387,428 | 6/1983 | Ishida et al. . |
| 4,777,365 | 10/1988 | Torii et al. . |
| 4,864,134 | 9/1989 | Hosoi et al. . |
| 4,889,233 | 12/1989 | Torii ....................... 378/182 X |
| 4,889,989 | 12/1989 | Yoshimura et al. ......... 378/182 X |
| 4,975,590 | 12/1990 | Tanaka ..................... 378/185 X |

FOREIGN PATENT DOCUMENTS

56-11395 2/1981 Japan .
103229 5/1988 Japan ........................ 378/182

Primary Examiner—Robert P. Olszewski
Assistant Examiner—Boris Milef
Attorney, Agent, or Firm—Sughrue, Mion, Zinn, Macpeak & Seas

[57] ABSTRACT

A stimulable phosphor sheet cassette has a light-tight casing which has an opening through which a stimulable phosphor sheet can be got in and out of the casing by moving the stimulable phosphor sheet in a direction parallel to the surface thereof and a light shielding member provided at the opening to prevent light from entering the casing but to permit the stimulable phosphor sheet to move through the opening. The casing is in such a size that it receives the stimulable phosphor sheet with one end portion of the stimulable phosphor sheet projecting outside the casing through the opening. A stimulable phosphor sheet feeding and storing mechanism includes a cassette supporting frame on which the stimulable phosphor sheet cassette is demountably mounted, and a sheet feeding roller which moves said one end portion of the stimulable phosphor sheet in the direction parallel to the surface of the stimulable phosphor sheet away from the cassette through the opening to take out and feed the stimulable phosphor sheet. The sheet feeding roller also serves to move a stimulable phosphor sheet free from a radiation image in a direction parallel to the surface of the sheet to get it in the cassette through the opening and stores the sheet in the cassette.

12 Claims, 6 Drawing Sheets

STIMULABLE PHOSPHOR SHEET FEEDING AND STORING MECHANISM AND STIMULABLE PHOSPHOR SHEET CASSETTE

This is a continuation of application Ser. No. 07/684,119 filed Apr. 12, 1991, now abandoned.

BACKGROUND OF THE INVENTION

1. Field of the Invention

This invention relates to a stimulable phosphor sheet feeding and storing mechanism which takes out a stimulable phosphor sheet which has been stored in a stimulable phosphor sheet cassette from the cassette and feeds it to a radiation image recording and reproducing system or the like, and stores another stimulable phosphor sheet in the cassette. This invention also relates to a stimulable phosphor sheet cassette which is suitable for use in the stimulable phosphor sheet feeding and storing mechanism.

2. Description of the Related Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, which is used when the radiation image of the object is reproduced as a visible image on a recording material such as photographic film, a display device such as a cathode ray tube (CRT), or the like.

Since the stimulable phosphor sheet has generally been stored in a light-tight cassette and is loaded in the radiation image recording system in the state, it will be convenient to arrange a radiation image read-out system so that the stimulable phosphor sheet can be loaded therein as it is in the cassette and a recovered stimulable phosphor sheet can be taken out from the system as it is stored in the cassette.

This applicant has proposed a radiation image read-out system having a stimulable phosphor sheet feeding and storing mechanism which automatically takes out a stimulable phosphor sheet from a cassette and feeds it to the read-out section, and automatically stores in the cassette a stimulable phosphor sheet the radiation image on which has been read out and erased. See U.S. Pat. No. 4,777,365, for example.

Though the stimulable phosphor sheet feeding and storing mechanism is very useful, a long time is required for feeding and storing the stimulable phosphor sheet since the mechanism must open and close the lid of the cassette in order to take out the sheet from the cassette and to store the same in the cassette and feeding the sheet involves lifting of the sheet by suction. Further, the means for applying suction to the sheet such as a suction arm makes the stimulable phosphor sheet feeding and storing mechanism complex in structure and adds to the manufacturing cost of the same.

Further, the openable lid adds to the manufacturing cost of the cassette.

SUMMARY OF THE INVENTION

In view of the foregoing observations and description, the primary object of the present invention is to provide a stimulable phosphor sheet feeding and storing mechanism which is simple in structure and can be manufactured at low cost and in which the time required for feeding and storing the stimulable phosphor sheet can be shortened.

Another object of the present invention is to provide a stimulable phosphor sheet cassette which is especially suitable for use in the stimulable phosphor sheet feeding and storing mechanism in accordance with the present invention and which is simple in structure and can be manufactured at low cost.

The stimulable phosphor sheet feeding and storing mechanism in accordance with a first aspect of the present invention comprises a cassette supporting unit on which a stimulable phosphor sheet cassette is demountably mounted with a stimulable phosphor sheet being held in the stimulable phosphor sheet cassette with one end portion thereof projecting outside the cassette through an opening, the opening being formed so that the stimulable phosphor sheet can be moved in and out of the cassette through the opening by moving the stimulable phosphor sheet in a direction parallel to the surface thereof, a sheet feeding unit which moves the one end portion of the stimulable phosphor sheet in the direction parallel to the surface of the stimulable phosphor sheet away from the cassette through the opening to take out and feed the stimulable phosphor sheet, and a sheet storing unit which moves a stimulable phosphor sheet free from a radiation image in a direction parallel to the surface of the sheet to move it in the cassette through the opening and stores the sheet in the cassette.

The stimulable phosphor sheet cassette in accordance with a second aspect of the present invention comprises a light-tight casing which has an opening through which a stimulable phosphor sheet can be moved in and out of the casing by moving the stimulable phosphor sheet in a direction parallel to the surface thereof and a light shielding member provided at the opening to prevent light from entering the casing but to permit the stimulable phosphor sheet to move through the opening, and which is in such a size that it receives the stimulable phosphor sheet with one end portion of the stimulable phosphor sheet projecting outside the casing through the opening.

With the combination of the stimulable phosphor sheet cassette and the stimulable phosphor sheet feeding and storing mechanism in accordance with the first and second aspects of the present invention, no lid must be opened and closed when the mechanism takes out the stimulable phosphor sheet and stores it, and the stimulable phosphor sheet in the cassette can be taken out by simply drawing the end portion projecting outside the cassette. Accordingly, feeding and storing the stimulable phosphor sheet can be effected in a very short time.

Generally it is preferred that a mechanism double as the sheet feeding unit and the sheet storing unit of the stimulable phosphor sheet feeding and storing mechanism. As the sheet feeding unit of the feed storing means, a roller which abuts against the stimulable phosphor sheet under pressure and rotates is suitably employed.

When such a roller is employed, a supporting means for supporting the sheet from the side opposite to the roller is required. In the case of the cassette described above, it is preferred that the supporting unit be provided to a position opposed to the end portion of the sheet projecting outside the cassette.

Such a supporting unit may be provided as a part of the cassette or may be provided as a part of the stimulable phosphor sheet feeding and storing mechanism.

However, when the sheet feeding unit or the sheet storing unit comprises a mechanism which moves the stimulable phosphor sheet by way of engagement with, for instance, an engagement hole formed in the end portion of the sheet projecting outside the cassette, the supporting unit is not necessary.

In accordance with a third aspect of the present invention, there is provided a stimulable phosphor sheet cassette comprising a light-tight casing which has an opening through which a stimulable phosphor sheet can be moved in and out of the casing by moving the stimulable phosphor sheet in a direction parallel to the surface thereof, and a sheet driving unit which, is provided in the casing near the opening and moves the stimulable phosphor sheet in and out of the casing.

The cassette in accordance with the third aspect of the present invention is loaded in the stimulable phosphor sheet feeding and storing mechanism described above with one end portion of the stimulable phosphor sheet being projected outside the cassette through the opening by the sheet driving unit.

DESCRIPTION OF THE PREFERRED EMBODIMENTS

Figure 1:
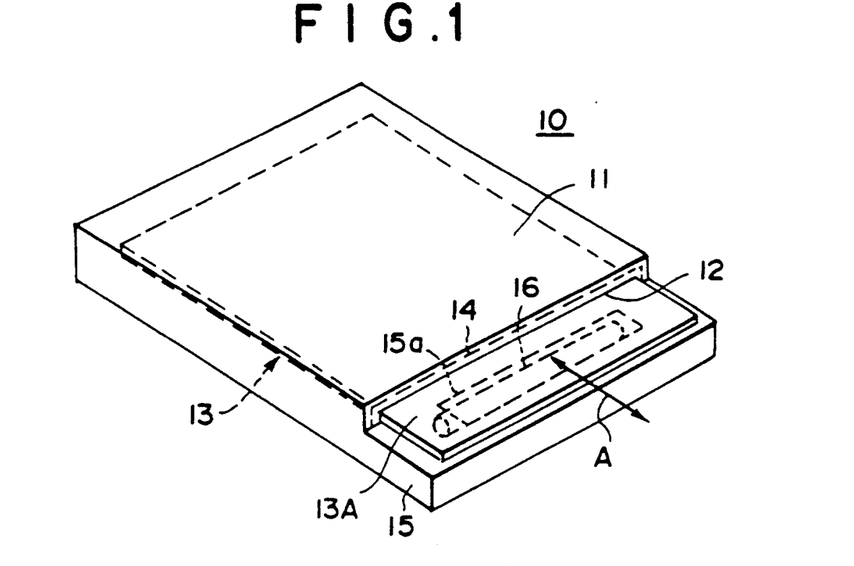
FIG. 1 is a perspective view showing a stimulable phosphor sheet cassette in accordance with a first embodiment of the present invention.
Figure 3:
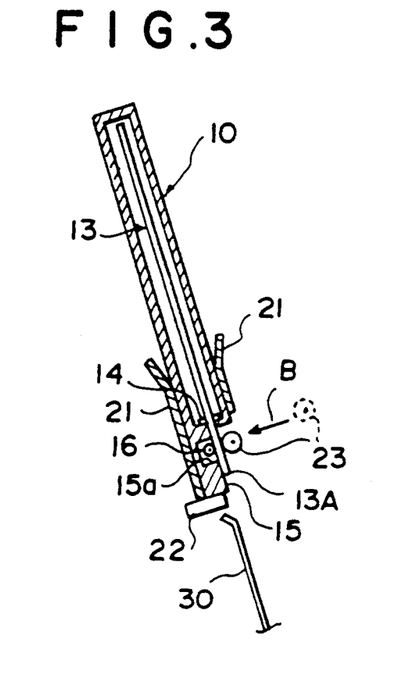
FIG. 3 is an enlarged cross-sectional view showing the stimulable phosphor sheet feeding and storing mechanism of the first embodiment.

In FIGS. 1 and 3, a stimulable phosphor sheet cassette 10 in accordance with a first embodiment of the present invention basically comprises a light-tight box-like casing 11 made of, for instance, synthetic resin. An opening 12 is formed in one end face wall of the casing 11. A stimulable phosphor sheet 13 is moved in and out of the casing 11 through the opening 12 by moving it in a direction parallel to the surface thereof (in the direction of arrow A). The casing 11 is of such a size that a leading end portion 13A of the stimulable phosphor sheet 13 projects through the opening 12 outside of the casing 11 when the sheet 13 is stored in the casing 11. A light shielding member 14 which prevents external light from entering the casing 11 is provided at the opening 12.

The casing 11 is provided with a sheet support portion 15 which extends below the leading end portion 13A of the sheet 13. A recess 15a is formed in the sheet support portion 15 to extend in the transverse direction of the sheet 13. The length of the recess 15a is smaller than the width of the sheet 13. A support roller 16 is rotatably received in the recess 15a to extend in the transverse direction of the sheet 13.

Figure 4:
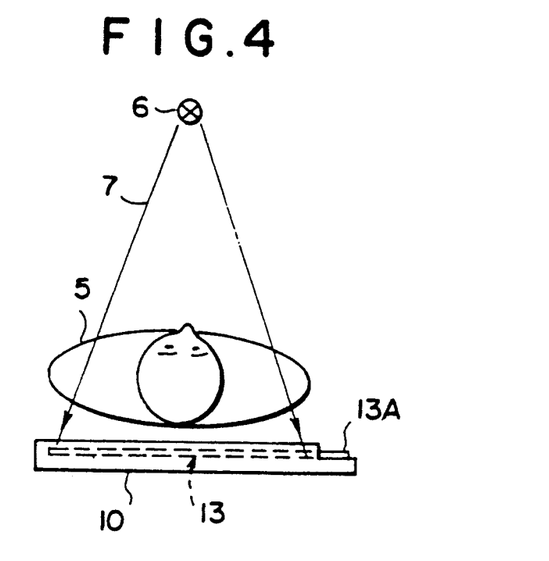
FIG. 4 is a schematic view for illustrating a radiation image recording by the use of the cassette shown in FIG. 1.

The cassette 10 of this embodiment is subjected to radiation image recording in the manner shown in FIG. 4. That is, the cassette 10 is positioned so that the part of the sheet 13 housed in the casing 11 is exposed to radiation emitted from a radiation source 6 such as an X-ray tube and passing through an object 5. Thus a radiation image of the object 5 is stored on the part of the sheet 13 in the casing 11.

Since the inside of the casing 11 is shielded from light, no problem arises even if the cassette 10 is placed in a light room before or after radiation image recording.

Figure 2:
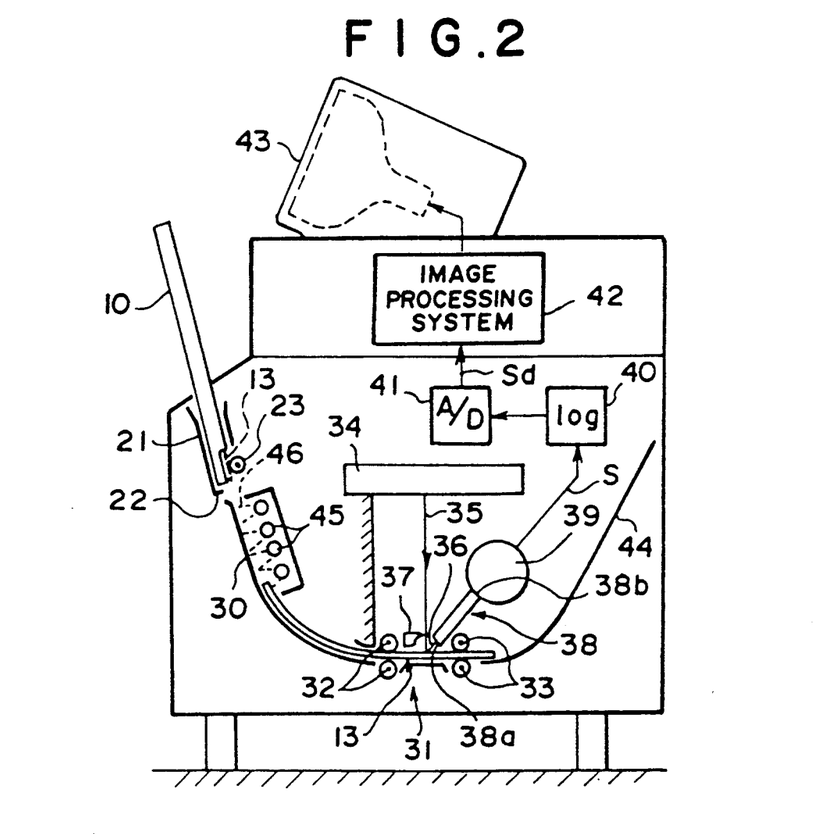
FIG. 2 is a side view of a radiation image read-out system provided with a stimulable phosphor sheet feeding and storing mechanism in accordance with a first embodiment of the present invention.

The cassette 10 which has been exposed to radiation passing through the object 5 is loaded in the radiation image read-out system shown in FIG. 2, and the radiation image stored on the sheet 13 is read out by the system. How the stimulable phosphor sheet 13 stored in the cassette 10 is fed to the radiation image read-out system by the stimulable phosphor sheet feeding and storing mechanism of this embodiment will be described first. The cassette 10 is inserted into a cassette supporting frame 21 from the sheet support portion 15 until the front face of the sheet support portion 15 abuts against a stopper 22. In this state, a feeding and storing roller 23 is waiting away from the leading end portion 13A of the sheet 13 projecting outside the casing 11 (in the position shown by the broken line in FIG. 3).

When the cassette 10 has been positioned in place which is detected by a limit switch, a photoelectric sensor or the like, the feeding and storing roller 23 is moved in the direction of arrow B in FIG. 3 and is brought into abutment against the support roller 16 on the sheet support portion 15 with the leading end portion 13A of the stimulable phosphor sheet 13 intervening therebetween. Then the feeding and storing roller 23 is rotated in the counterclockwise direction as seen in FIGS. 2 and 3, whereby the sheet 13 is drawn out from the cassette 10 and caused to fall on a guide plate 30.

The feeding and storing roller 23 presses against the sheet 13 in order to convey it in the manner described above, and the sheet 13 is supported against the pressure of the feeding and storing roller 23 by the support roller 16.

The guide plate 30 guides the sheet 13 to a radiation image read-out section 31. At the read-out section 31, the sheet 13 is conveyed rightward in FIG. 2 at a constant speed by two pairs of nip rollers 32 and 33 and at the same time, a laser beam 35 (as stimulating rays) is caused to scan the sheet 13 in the direction normal to the direction of conveyance of the sheet 13 by a scanner 34, whereby the sheet 13 is two-dimensionally scanned by the laser beam 35.

The portion of the stimulable phosphor sheet 13 exposed to the laser beam 35 emits light 36 with an intensity proportional to the amount of energy stored during exposure to radiation, and the light 36 enters a light guide 38 at a light input end face 38a thereof directly or after being reflected by a mirror 37. The light guide 38 is at least equal to the width of the sheet 13 in length, and the other end face or the light output end face 38b of the light guide 38 is optically connected to a light receiving face of a long photomultiplier tube 39. The long photomultiplier tube 39 produces an analog output S corresponding to the intensity of the light 36 received. The long photomulipier tube 39 is described in detail in U.S. Pat. No. 4,864,134, for instance.

The analog output S carrying the radiation image information read out over the entire recording area of the sheet 13 is amplified by logarithmic amplifier 40 and then input into an A/D convertor 41, where it is converted into a digital image signal Sd.

The image signal Sd is processed e.g., gradation processing, frequency enhancement processing or the like by an image processing system 42 and then input into an image reproducing system 43 which may comprise a CRT, for example. The image reproducing system 43 reproduces the radiation image of the object carried by the image signal Sd as a visible image.

Instead of the image reproducing system 43 described above, other systems such as a light spot scanning recording system may be employed. Further, the image signal Sd may be stored in a recording medium such as an optical disk or a magnetic disk before being input into the reproducing system.

At the time read-out of the radiation image information has been finished, the sheet 13 rests on a guide plate 44 with the trailing end thereof nipped between the nip rollers 33. Thereafter the nip rollers 33 and 32 are rotated in the reverse direction, whereby the sheet 13 is moved toward the cassette 10 along the guide plate 30 passing through the read-out section 31.

While the sheet 13 is moved toward the cassette 10, erasing light sources 45 each producing erasing light having a wavelength within the stimulating wavelength range for the sheet 13 are turned on, whereby the radiation energy remaining on the stimulable phosphor sheet 13 is released therefrom.

At this time, the feeding and storing roller 23 is rotating in the reverse direction, i.e., in the clockwise direction in FIGS. 2 and 3, and accordingly, when the trailing end portion of the sheet 13 is inserted between the feeding and storing roller 23 and the sheet support portion 15, the sheet 13 is introduced into the cassette 10 through the opening 12. When the sheet 13 is inserted into the cassette 10 to the position shown in FIG. 1 where the leading end portion 13A projects outside the casing 11, the feeding and storing roller 23 is stopped and storing of the sheet 13 is completed.

After being stopped, the feeding and storing roller 23 is moved in the direction opposite to the arrow B away from the stimulable phosphor sheet 13. The cassette 10 can be drawn out from the cassette supporting frame 21 by pulling upward on the cassette 10. Thereafter, the cassette 10 may be used for recording a radiation image as it is.

Figure 5:
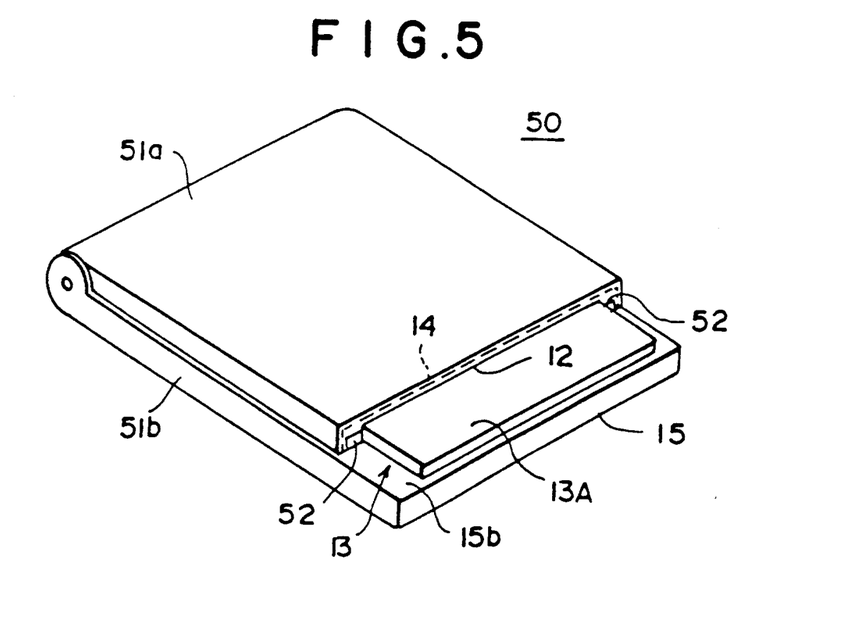
FIG. 5 is a perspective view showing a stimulable phosphor sheet cassette in accordance with a second embodiment of the present invention.

FIG. 5 shows a second embodiment of the present invention. In FIG. 5 and the following drawings, the elements analogous to those shown in FIGS. 1 to 4 are given the same reference numerals and will not be described.

The cassette 50 of this embodiment comprises an upper casing half 51a and a lower casing half 51b which are urged toward each other by a suitable means such as a spring (not shown) and forms a box-like structure as shown in FIG. 5. With this arrangement, the stimulable phosphor sheet 13 is pinched by the upper and lower casing halves 51a and 51b at the opening 12 and accordingly, the sheet 13 is prevented from accidentally falling off the cassette 50. A recess 52 is formed in the lower edge of the upper casing half 51a on each side of the opening 12 and opens to the opening 12.

Figures 6, 7, 8:
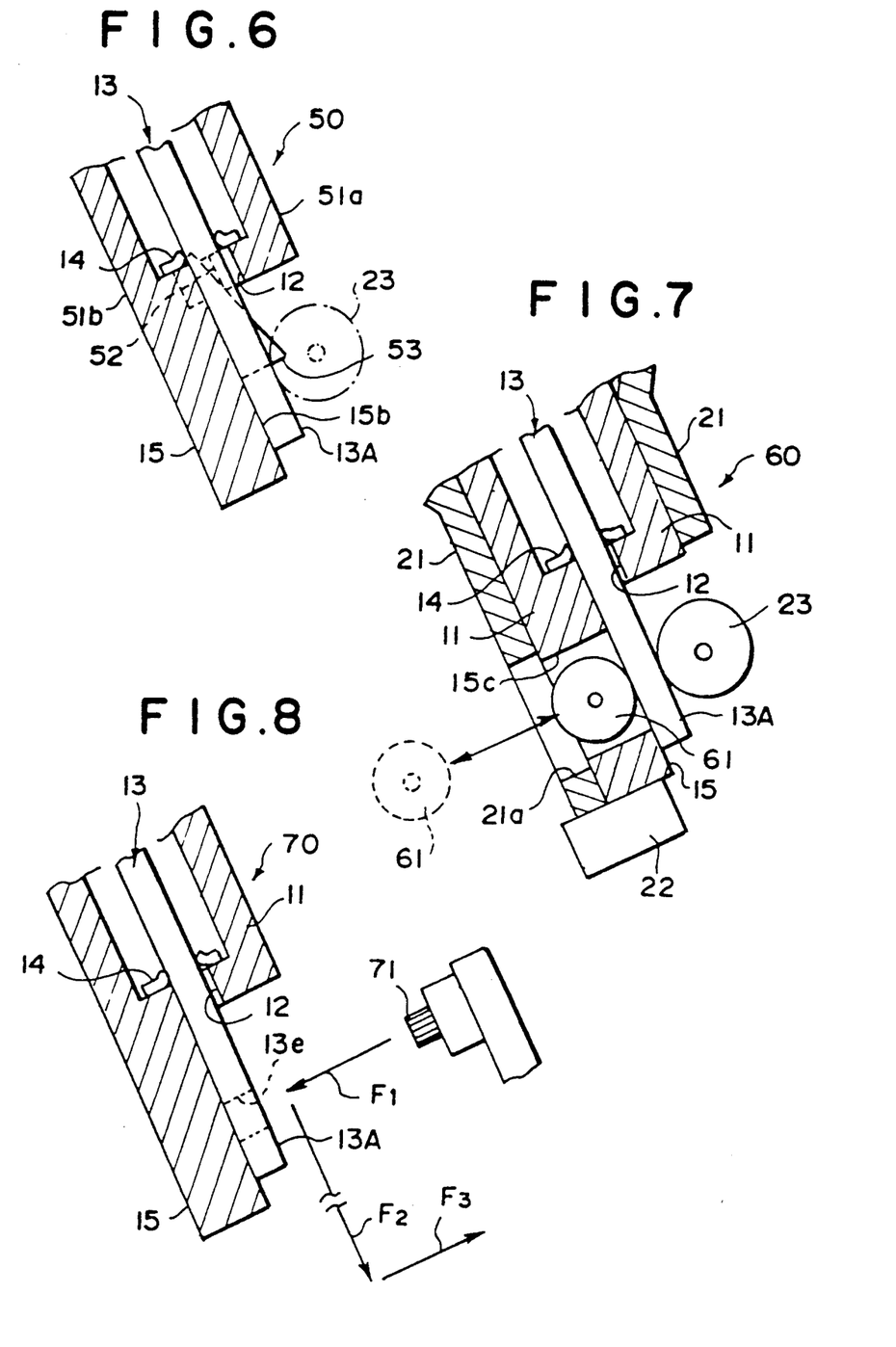
FIG. 6 is a fragmentary cross-sectional view showing a stimulable phosphor sheet feeding and storing mechanism in accordance with a second embodiment of the present invention in combination with the cassette in accordance with the second embodiment.
FIG. 7 is a fragmentary cross-sectional view showing a stimulable phosphor sheet feeding and storing mechanism in accordance with a third embodiment of the present invention in combination with a cassette in accordance with a third embodiment.
FIG. 8 is a fragmentary cross-sectional view showing a stimulable phosphor sheet feeding and storing mechanism in accordance with a fourth embodiment of the present invention in combination with a cassette in accordance with a fourth embodiment.

The stimulable phosphor sheetfeeding and storing mechanism for the cassette 50 is provided with a pair of wedge-like members 53 which is inserted into the recesses 52 to force the halves 51a and 51b away from each other to some extent as shown in FIG. 6 when the cassette 50 is inserted to a predetermined position. With this arrangement, feeding and storing of the sheet 13 is facilitated.

In this embodiment, instead of providing a support roller, the upper surface 15b of the sheet support portion 15 is smoothed. Also with this arrangement, the sheet 13 can be smoothly moved in and out of the casing 11 by the feeding and storing roller 23.

As shown in FIG. 7, a cassette 60 in accordance with a third embodiment of the present invention is provided with an elongated through hole 15c in the sheet support portion 15 which is slightly shorter than the width of the sheet support portion 15. Further, the cassette supporting frame 21 is provided with an elongated through hole 21a which is aligned with the through hole 15a of the cassette 60 when the cassette 60 is inserted to the predetermined position. A supporting roller 61 is normally in the waiting position shown by the broken line in FIG. 7 and is moved to the position shown by the solid line where it supports the sheet 13 when the cassette 60 is inserted into the predetermined position and the sheet 13 is pressed downward by the feeding and storing roller 23.

As shown in FIG. 8, in a cassette 70 in accordance with a fourth embodiment of the present invention, a plurality of (e.g., two) holes 13e are formed in the leading end portion 13A of the stimulable phosphor sheet 13 spaced from each other in the transverse direction of the sheet 13. The stimulable phosphor sheet feeding and storing mechanism for the cassette 10 of this embodiment is provided with, instead of the feeding and storing roller 23, feeding and storing pins 71 which are adapted to engage with the holes 13e.

When feeding the sheet 13, the pins 71 are moved in the direction of arrow F1 into the holes 13e, and then moved in the direction of arrow F2, thereby drawing the sheet 13 out of the casing and conveying it to a predetermined position. Then the pins 71 are moved in the direction of arrow F3 away from the holes 13e, and waits there.

When storing the sheet 13, the pins 71 are moved in the direction opposite to the arrow F3 into the holes 13e and then are moved in the direction opposite to the arrow F2, thereby inserting the sheet 13 in the casing 11, and thereafter, the pins 71 are moved in the direction opposite to the arrow F1 away from the holes 13e.

A cassette 110 in accordance with a fifth embodiment of the present invention will be described with reference to FIGS. 9 and 10a to 10c, hereinbelow.

The cassette 110 comprises a casing 114 which forms a chamber 112 in which the sheet 13 is stored and is provided with an opening 116 formed in one end face of the casing 114 and communicating with the chamber 112, a pair of rollers 118 and 120 which are disposed between the opening 116 and tee chamber 112 and are supported for rotation on the side wall of the casing 114 (FIGS. 9 and 10c), a pair of gears 122 and 123 mounted on opposite ends of the roller 118, a pair of gears 124 and 125 mounted on opposite ends of the roller 120, a pair of stoppers 126 and 128 which are adapted to engage with the gear 122 to prevent rotation of the rollers 118 and 120, and a flexible light shielding member 130 which closes the opening 116 in a light-tight fashion while easily deforming to permit the sheet 13 to move through the opening 116.

Figure 10A:
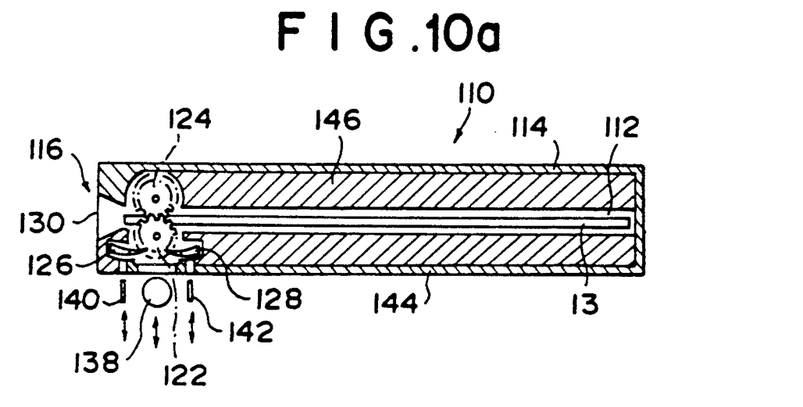
FIGS. 10a, 10b and 10c are a longitudinal cross-sectional view, a bottom view and a transverse cross-sectional view of the cassette shown in FIG. 9.
Figure 10B:
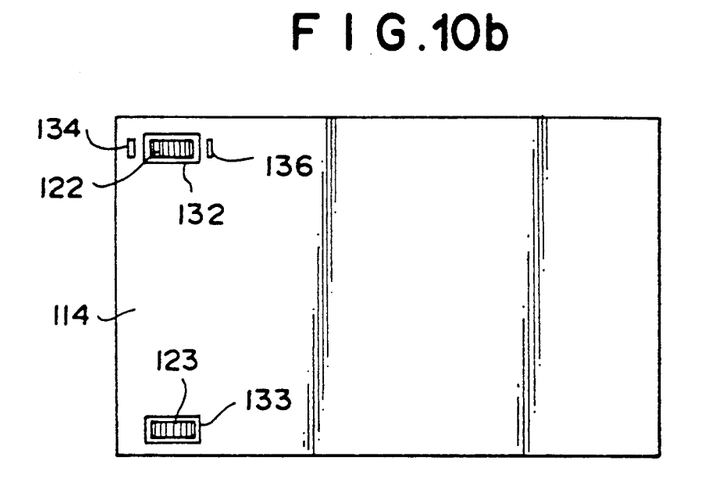
Figure 10C:
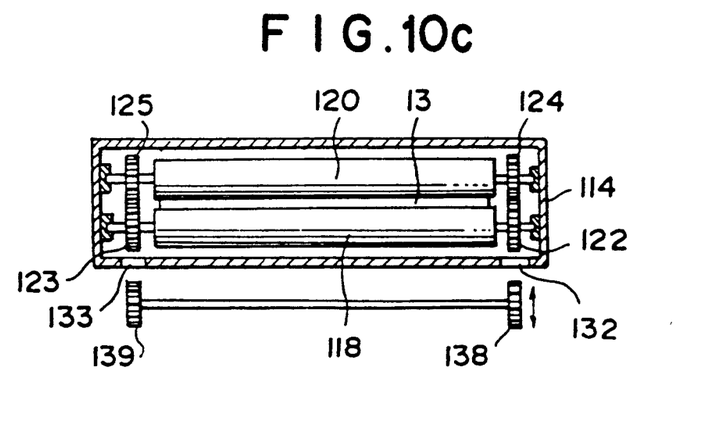

As shown in FIGS. 10b and 10c, the lower wall of the casing 114 is provided with a pair of openings 132 and 133 below the gears 122 and 123, and a pair of lock release holes 134 and 136 are provided on opposite sides of the opening 132.

When the sheet 13 is introduced into the cassette 110 to store it in the cassette 110 or is taken out from the cassette 110, a pair of gears 138 and 139 mounted on a shaft as shown in FIG. 10c are moved upward through the openings 132 and 133 and are brought into engagement with the gears 122 and 123. At the same time, a pair of pins 140 and 142 are moved upward through the lock release holes 134 and 136 and disengages the stoppers 126 and 128 from the gear 122, thereby permitting the rollers 118 and 120 to rotate. The gears 138 and 139 are rotated by a driving means (not shown) which is disposed outside the cassette 110.

Then when the gears 138 and 139 are rotated, the rollers 118 and 120 are rotated by way of engagements between the gears 138 and 122, between the gears 139 and 123, between the gears 122 and 124 and between the gears 123 and 125, and the sheet 13 is moved in the cassette 110 or moved out of the cassette 110 depending of the direction of rotation of the rollers 118 and 120.

Figure 9:
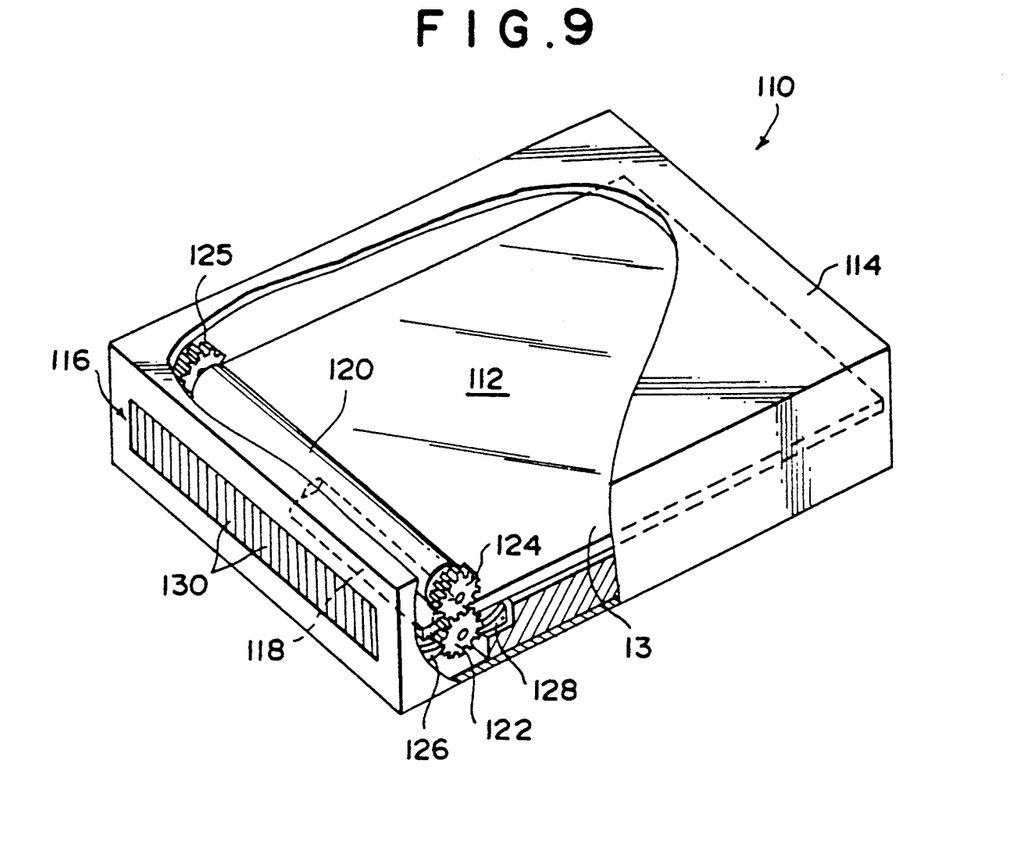
FIG. 9 is a perspective view partly cut away of a cassette in accordance with a fifth embodiment of the present invention.

A pair of retainers 144 and 146 which secure the sheet 13 in the chamber 112 during transfer of the cassette 110, thereby preventing the surface of the stimulable phosphor layer of the sheet 13 from being damaged are bonded on the inner surface of the cassette 110. Preferably, the retainers 144 and 146 are made of elastic material such as rubber, urethane, sponge, foamed styrol or the like.

The opening 116 is slightly larger in cross-section than the sheet 13.

The light shielding member 130 which closes the opening 116 may comprise, for instance, a black light shielding screen which has high flexibility but which also is somewhat rigid, or a brush-like member formed of a number of black hair-like materials.

Since the rollers 118 and 120 are disposed inside the cassette 110, it is preferred that they are small in diameter. Further a plurality of rollers connected in series may be used instead of the roller 118 or 120 which is a single long roller.

Though, in this embodiment, each of the rollers 118 and 120 is provided with a pair of rollers in order to drive it, the rollers 118 and 120 may be driven by only a pair of rollers mounted on the same side ends of the respective roller. However the former arrangement is preferred in order to convey the sheet 13 in a better manner. Further, instead of driving the roller 120 together with the roller 118 by way of the engagement of gears, the roller 120 may be caused to follow the roller 118 by way of the sheet 13 by pressing the roller 118 toward the roller 120 by means of a spring or the like. In this case, only the gear 122 on one end of the roller 118 is necessary. Any other suitable mechanism may be employed in order to transmit rotation of the roller 118 to the roller 120.

The stoppers 126 and 128 are for preventing the rollers 118 and 120 from accidentally rotating to get the sheet 13 out of the cassette 110. As described above, the stopper 126 and 128 are disengaged from the gear 122, to permit the rollers 118 and 120 to rotate, by means of the pins 140 and 142 which act on the stoppers 126 and 128 through the lock release holes 134 and 136 when the gears 122 and 123 are driven by the gears 138 and 139. It is preferred that the stoppers 126 and 128 are urged toward the gear 122 by a suitable urging means such as a spring so that they are automatically brought into engagement with the gear 122 when the pins 140 and 142 are retracted away from the lock release holes 134 and 136.

The rollers 118 need not be locked by two stoppers but may be locked by a single stopper so long as the single stopper can surely prevent rotation of the roller 118 when the sheet 13 is to be held in the cassette 110 while permitting rotation of the roller 118 when the sheet 113 is to be stored in the cassette 110 or to be taken out from the same. The manner of bringing the stoppers 126 and 128 into engagement with the gear 112 or disengaging them need not be limited to that illustrated. Further, the stoppers 126 and 128 may act on one of the other gears.

Figure 11:
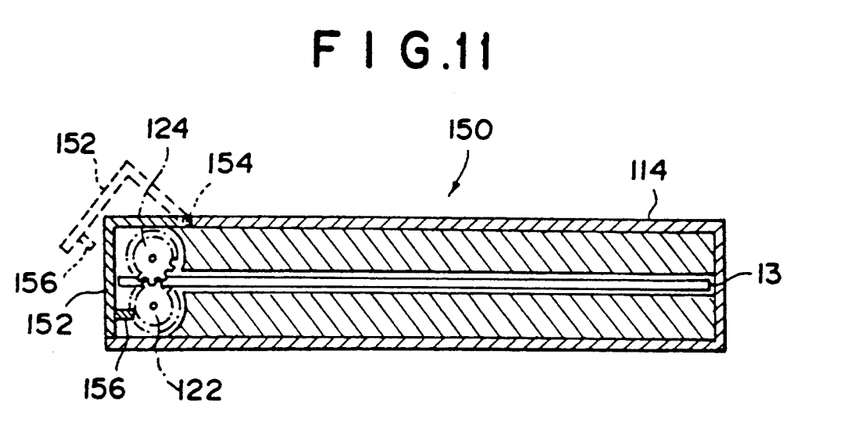
FIG. 11 is a cross-sectional view of a cassette in accordance with a sixth embodiment of the present invention.

In a cassette 150 shown in FIG. 11 in accordance with a sixth embodiment of the present invention, the stimulable phosphor sheet 13 stored therein is shielded from light by a lid member 152 which can be opened and closed. In FIG. 11, the lid member 152 is mounted on the casing 114 by a hinge 154 and covers the end face through which the sheet 13 is moved in and out of the casing 114. A projection 156 is provided on the inner surface of the lid member 152 so that it engages with the gear 122 to prevent rotation of the rollers 118 and 120 when the lid member 152 is closed. However since the lid member 152, also serves as a means for preventing the sheet 13 from being moved out of the cassette 150, the projection 156 may be omitted.

The lid member 152 may be opened by any known manner. For example, the lid member 152 may be opened by a pin which is lifted when the gears 138 and 139 are brought into engagement with the gears 122 and 123.

It is preferred that the portion which is positioned between the rollers 118 and 120 when the sheet 13 is stored in the cassette 110 or 150 be a portion outside the recording area.

When the cassette 110 or 150 is loaded in the stimulable phosphor sheet feeding and storing mechanism shown in FIG. 2, the gears 122 and 123 are rotated to project the leading end portion of the sheet 13 from the cassette in advance and the cassette is loaded in the stimulable phosphor sheet feeding and storing mechanism in the state. Otherwise the stimulable phosphor sheet feeding and storing mechanism may be provided with gears like the gears 138 and 139 which are adapted to engage with the gears 122 and 123 and to rotate in synchronization with the feeding and storing roller 23 (in FIG. 2) so that the sheet 13 is delivered to the roller 23 from the rollers 118 and 120 when the sheet 13 is fed to the reproducing system and is delivered to the rollers 118 and 120 from the roller 23 when the sheet 13 is stored in the cassette.

The cassettes 110 and 150 of the fifth and sixth embodiments can be used not only for the radiation image read-out system or the recording system provided with the stimulable phosphor sheet feeding and storing mechanism in accordance with the present invention but for other systems not provided with a stimulable phosphor sheet feeding and storing mechanism.

As can be understood from the description above, when the cassette of the present invention and the stimulable phosphor sheet feeding and storing mechanism of the present invention are employed, the radiation image read-out system need not be provided with a lid opening mechanism and suction mechanism for taking out the stimulable phosphor sheet which are complex in structure and are large in size. Accordingly the system can be simplified in structure, can be reduced in size and can be manufactured at low cost.

Further, since neither the operation of the opening a lid nor the operation of taking out the sheet from the cassette by suction is necessary, the time required for feeding and storing the stimulable phosphor sheet can be substantially shortened.

Further, the cassettes in accordance with the first to fourth embodiments of the present invention are provided with no lid to be opened and closed and are very simple in structure. Accordingly, they can be manufactured at extremely low cost.

We claim:

1. A stimulable phosphor sheet feeding and storing mechanism, comprising:
   a stimulable phosphor sheet cassette;
   cassette supporting means for dismountably mounting thereon the stimulable phosphor sheet cassette, a stimulable phosphor sheet being stored in said stimulable phosphor sheet cassette with one end portion of the stimulable phosphor sheet projecting outside the cassette through an opening, the opening being formed so that the stimulable phosphor sheet is movable in and out of the cassette through the opening by moving the stimulable phosphor sheet in a direction parallel to a surface of the cassette,
   sheet feeding means for moving said one end portion of the stimulable phosphor sheet in the direction parallel to the surface of the cassette away from the cassette through the opening to take out and feed the stimulable phosphor sheet,
   sheet storing means for moving a stimulable phosphor sheet free from a radiation image in the direction parallel to the surface of the cassette to move the sheet into the cassette through the opening and for storing the sheet in the cassette.

2. A stimulable phosphor sheet feeding and storing mechanism as defined in claim 1, wherein said mechanism further comprises sheet erasing means for erasing the radiation image from the stimulable phosphor sheet.

3. A stimulable phosphor sheet feeding and storing mechanism as defined in claim 2, wherein said sheet storing means includes means for returning the stimulable phosphor sheet, after the radiation image thereon has been erased by said sheet erasing means, to the cassette from which the stimulable phosphor sheet was extracted.

4. A stimulable phosphor sheet cassette, comprising:
   a light-tight casing which has an opening through which a stimulable phosphor sheet is movable in and out of the casing by moving the stimulable phosphor sheet in a direction parallel to a surface of the cassette,
   a light-shielding member provided at the opening to prevent light from entering the casing and for permitting the stimulable phosphor sheet to move through the opening in the direction parallel to the surface of the cassette, said casing having a size such that, when said casing fully receives the stimulable phosphor sheet, one end portion of the stimulable phosphor sheet projects outside the casing through the opening, and
   a sheet support member which is opposed to said one end portion of the stimulable phosphor sheet and which supports the one end portion of said stimulable phosphor sheet when said stimulable phosphor sheet is stored in said casing, said sheet support member being positioned adjacent and in contact with said one end portion of the stimulable phosphor sheet.

5. A stimulable phosphor sheet cassette as defined in claim 4, wherein said sheet support member includes means for supporting the stimulable phosphor sheet when said stimulable phosphor sheet is pressed from a second side thereof, at least a portion of said supporting means being positioned outwardly of said casing.

6. A stimulable phosphor sheet cassette, comprising:
   a light-tight casing which has an opening through which a stimulable phosphor sheet is movable in and out of the casing by moving the stimulable phosphor sheet in a direction parallel to a surface of the cassette;
   light shielding means provided at the opening for preventing light from entering the casing and for simultaneously permitting the stimulable phosphor sheet to move through the opening in a direction parallel to the surface of the cassette; and
   means for supporting an end portion of the stimulable phosphor sheet when said stimulable phosphor sheet is stored in said casing, said sheet supporting means being positioned adjacent and in contact with said end portion of the stimulable phosphor sheet, at least a portion of said supporting means being positioned outwardly of said light-tight casing.

7. A stimulable phosphor sheet cassette according to claim 6, wherein said casing has a size such that, when said casing has said stimulable phosphor sheet stored therein, said end portion of the stimulable phosphor sheet projects outside the casing through the opening.

8. A stimulable phosphor sheet cassette according to claim 7, wherein said end portion of said stimulable phosphor sheet is supported by said at least a portion of said supporting means positioned outwardly of said light-tight casing.

9. A stimulable phosphor sheet cassette as claimed in claim 6, further comprising:
   sheet driving means for moving the stimulable phosphor sheet into and out of said casing.

10. A stimulable phosphor sheet cassette as claimed in claim 9, wherein said sheet driving means comprises a roller.

11. A stimulable phosphor sheet cassette as claimed in claim 9, wherein said sheet driving means comprises a pair of pinch rollers.

12. A stimulable phosphor sheet cassette as claimed in claim 11, further comprising:
   stopped means which selectively prevents said pinch rollers from rotating.

* * * * *